United States Patent
Kim et al.

(10) Patent No.: US 8,144,426 B2
(45) Date of Patent: Mar. 27, 2012

(54) PERPENDICULAR MAGNETIC RECORDING HEAD HAVING FRONT AND BACK POLES OF DIFFERENT SPECIFIC RESISTANCES

(75) Inventors: Yong-su Kim, Seoul (KR); Kook-hyun Sunwoo, Hwaseong-si (KR); Kyoung-won Na, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1084 days.

(21) Appl. No.: 12/028,025

(22) Filed: Feb. 8, 2008

(65) Prior Publication Data
US 2008/0278852 A1 Nov. 13, 2008

(30) Foreign Application Priority Data
May 8, 2007 (KR) .................. 10-2007-0044719

(51) Int. Cl.
*G11B 5/127* (2006.01)

(52) U.S. Cl. .................................................. 360/125.06
(58) Field of Classification Search . 360/125.03–125.15
See application file for complete search history.

(56) References Cited

U.S. PATENT DOCUMENTS

| | | | |
|---|---|---|---|
| 7,119,988 B2 * | 10/2006 | Lille | 360/125.12 |
| 7,609,591 B2 * | 10/2009 | Suh et al. | 369/13.33 |
| 7,646,564 B2 * | 1/2010 | Maruyama et al. | 360/125.07 |
| 7,688,544 B1 * | 3/2010 | Mallary et al. | 360/125.06 |

* cited by examiner

*Primary Examiner* — Allen Heinz
(74) *Attorney, Agent, or Firm* — Sughrue Mion, PLLC

(57) ABSTRACT

A perpendicular magnetic recording head and a method of manufacturing said perpendicular magnetic recording head are provided. The perpendicular magnetic recording head has a main pole, a coil, which applies a magnetic field to the main pole, and a return pole constituting a magnetic circuit together with the main pole. The main pole has a back pole around which the coil is wound and a front pole contacting the back pole. The back pole and the front pole are formed on the same plane.

14 Claims, 9 Drawing Sheets

PERPENDICULAR MAGNETIC RECORDING HEAD HAVING FRONT AND BACK POLES OF DIFFERENT SPECIFIC RESISTANCES

CROSS-REFERENCE TO RELATED PATENT APPLICATION

This application claims priority from Korean Patent Application No. 10-2007-0044719, filed on May 8, 2007, in the Korean Intellectual Property Office, the disclosure of which is incorporated herein in its entirety by reference.

BACKGROUND OF THE INVENTION

1. Field of the Invention

Apparatuses and methods consistent with the present invention relate to a data recording head and a method of manufacturing the same and, more particularly, to a perpendicular magnetic recording head and a method of manufacturing the perpendicular magnetic recording head.

2. Description of the Related Art

Methods of recording data in a magnetic recording medium can be classified into either horizontal magnetic recording methods or perpendicular magnetic recording methods depending on how data is recorded. In horizontal magnetic recording methods, data is recorded using a magnetic layer having a magnetic polarization, which is aligned parallel to the surface of the magnetic layer. In perpendicular magnetic recording methods, data is recorded using a magnetic layer having a magnetic polarization, which is aligned perpendicular to the surface of the magnetic layer. Aligning the magnetic polarization perpendicular to the surface of the magnetic layer allows perpendicular magnetic recording methods to achieve a greater recording density than horizontal magnetic recording methods.

A process by which data is written to a magnetic layer can be seen as an interaction between the magnetic layer and a magnetic head. Therefore, there is a need to improve both the magnetic head as well as the magnetic layer in order to record data at high density.

FIG. 1 is a cross-sectional view of a related perpendicular magnetic recording head.

Referring to FIG. 1, the related perpendicular magnetic recording head includes a main pole p1 and a return pole p2. An upper end of the main pole p1 contacts an upper end of the return pole p2, and lower ends of the main pole p1 and the return pole p2 are spaced a predetermined interval apart. A magnetic field required for recording data is generated between the lower ends of the main pole p1 and the return pole p2. A portion between the upper end and the lower end of the return pole p2 is curved. The curved portion of the return pole p2 is spaced from the main pole p1. A predetermined portion of the main pole p1, which corresponds to the curved portion of the return pole p2, has a coil c wound around it. The coil c does not contact the main pole p1 or the return pole p2. As current flows through the coil c, a magnetic field is generated, and this magnetic field is concentrated on the main pole p1. The return pole p2 constitutes a magnetic circuit together with the main pole p1. A dotted line B connecting the lower end of the main pole p1 to the lower end of the return pole p2 denotes a magnetic circuit formed during the recording of data.

In the related perpendicular magnetic recording head the main pole p1 is generally formed of a material having a large saturation magnetization and a high conductivity. A large eddy current can be generated in a material having a large saturation magnetization and a high conductivity. This eddy current increases the inductance of the coil c causing signal delay. Accordingly, when an eddy current is generated, there can be an increased time interval between when a write current is supplied to the coil c and when data is recorded to the magnetic layer.

FIG. 2 is a graph showing the signal delay that can occur in the related perpendicular magnetic recording head of FIG. 1. Referring to FIG. 2, first and second plots G1 and G2 show the variation of a recording magnetic field according to time when the specific resistance of the main pole P1 is 10 µΩ·cm and 100 µΩ·cm, respectively. A third plot G3 shows the variation of the write current according to time.

Referring to FIG. 2, it can be seen that an interval I1 between the first plot G1 and the third plot G3 is greater than an interval I2 between the second plot G2 and the third plot G3. This shows that the smaller the specific resistance of the main pole P1 (i.e. the greater the conductivity of the main pole P1), the larger the signal delay. Accordingly, it is difficult to realize a high density data recording apparatus with good write properties using the related perpendicular magnetic recording head. Additionally, the signal delay can be further increased during high-frequency operation, where the variation of the magnetic field according to time is great, making such recording operations irregular.

Illustrative, non-limiting embodiments of the present invention overcome the above disadvantages and other disadvantages not described above. However, the present invention is not required to overcome the disadvantages described above, and an illustrative, non-limiting embodiment of the present invention may not overcome any of the problems described above.

SUMMARY OF THE INVENTION

An apparatus consistent with the present invention may provide a perpendicular magnetic recording head in which a signal delay due to an inductance increase of a coil may be reduced and the increase velocity of a magnetic flux in a main pole may be improved.

A method consistent with the present invention may also provide a method of manufacturing a perpendicular magnetic recording head.

According to one aspect of the present invention, there is provided a perpendicular magnetic recording head comprising: a main pole; a coil, which applies a magnetic field to the main pole; and a return pole constituting a magnetic circuit together with the main pole, wherein the main pole includes a back pole around which the coil is wound and a front pole contacting the back pole.

The back pole and the front pole may be formed on the same plane.

A specific resistance of the front pole may be smaller than a specific resistance of the back pole. A saturation magnetization of the front pole may be higher than a saturation magnetization of the back pole.

The front pole may be straight, and the back pole may contact an upper surface and a side surface of one end of the front pole. The side surface of the front pole, which contacts the back pole, may be a surface facing the return pole. The side surface of the front pole, which contacts the back pole, may be a first surface opposite a second surface of the front pole, wherein the second surface faces the return pole.

The back pole may include a first back pole, which contacts the upper surface of the front pole, and a second back pole, which contacts the side surface of the front pole.

A first end of the front pole may contact the back pole, and wherein a second end of the front pole is separated from the back pole by a distance in a range of 0.5 to 2.0 μm.

An overlap length, by which the front pole and the back pole overlap each other, may be in the range of 0.5 to 4.0 μm.

The front pole and the return pole may be separated by a distance in a range of 0.1 to 0.3 μm.

The width of the front pole may increase towards a portion of the front pole, which contacts the back pole.

According to another aspect of the present invention, there is provided a method of manufacturing a perpendicular magnetic recording head, comprising: forming a first inter-insulating layer including a first wiring on a lower structure; forming a front pole on a portion of the first inter-insulating layer, which is spaced away from the first wiring in a horizontal direction; forming a back pole thicker than the front pole on the first inter-insulating layer, wherein a portion of the back pole overlaps the front pole; forming an insulating layer covering a portion of the front pole which does not overlap the back pole, on the first inter-insulating layer to a height of the back pole; forming a second inter-insulating layer including a second wiring, which is connected to the first wiring to constitute a coil, on the back pole and the insulating layer; exposing a portion of the back pole, which is spaced from the first wiring in a horizontal direction, removing a portion of the second inter-insulating layer, which is above a portion of the front pole where the front pole does not overlap the back pole, and thinning the thickness of a portion of the insulating layer so as not to expose the back pole; and forming a return pole covering an exposed portion of the back pole and a thinned portion of the insulating layer on the second inter-insulating layer.

A first end of the front pole may contact the back pole, and wherein a second end of the front pole is separated from the back pole by a distance in a range of 0.5 to 2.0 μm.

A width of the front pole may increase towards a portion of the front pole, which overlaps the back pole.

A width of a portion of the back pole which overlaps the front pole may increase away from the front pole to a predetermined point of the back pole, and the width of the back pole may be constant beyond the predetermined point.

According to another aspect of the present invention, there is provided a method of manufacturing a perpendicular magnetic recording head, including: forming a first inter-insulating layer including a first wiring on a lower structure; forming a first back pole on a predetermined portion of the first inter-insulating layer, which includes the first wiring; forming a first insulating layer on the first inter-insulating layer around the first back pole to have the same thickness as the thickness of the first back pole; forming a front pole on the first insulating layer, wherein a portion of the front pole protrudes onto the first back pole; forming a second back pole on a portion of the first back pole, on which the front pole is not formed, to have the same thickness as the thickness of the front pole; forming a second inter-insulating layer including a second wiring, which is connected to the first wiring to constitute a coil, on the second back pole and the front pole; etching the second inter-insulating layer to expose a portion of the second back pole, which is opposite to the front pole and is spaced away from the first wiring in a horizontal direction, and thinning the second inter-insulating layer formed on the front pole; and forming a return pole covering an exposed portion of the second back pole and the second inter-insulating layer.

An end of the front pole may overlap the first back pole and wherein a second end of the front pole may be separated from the first back pole by a distance in a range of 0.5 to 2.0 μm.

A width of the front pole may increases towards a portion of the front pole, which overlaps the first back pole.

A width of a portion of the first back pole which overlaps the front pole may increase away from the front pole to a predetermined point of the first back pole, and the width of the first back pole may be constant beyond the predetermined point.

The forming of the second inter-insulating layer may further include: forming a second insulating layer around the second back pole and the front pole; and forming the second inter-insulating layer on the second back pole, the front pole and the second insulating layer.

Some illustrative embodiments of the present invention may allow improved recording density by preventing signal delay caused by increased inductance of a coil in a perpendicular magnetic recording head. However, an embodiment of the present invention is not required to allow improved recording density or prevent signal delay or decrease inductance of a coil.

BRIEF DESCRIPTION OF THE DRAWINGS

Aspects of the present invention will become more apparent by describing in detail illustrative embodiments thereof with reference to the attached drawings in which.

DETAILED DESCRIPTION OF EXEMPLARY EMBODIMENTS OF THE INVENTION

Figure 1:
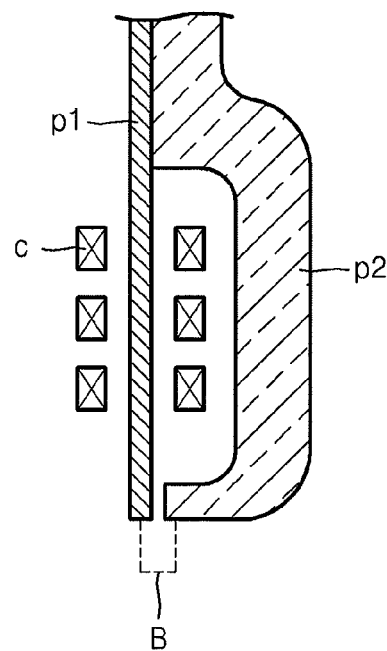
FIG. 1 is a cross-sectional view of a related perpendicular magnetic recording head.

Hereinafter, several illustrative embodiments of the present invention will be described in detail with reference to the attached drawings. In the drawings, the thickness of layers and regions have been exaggerated for clarity.

Figure 3:
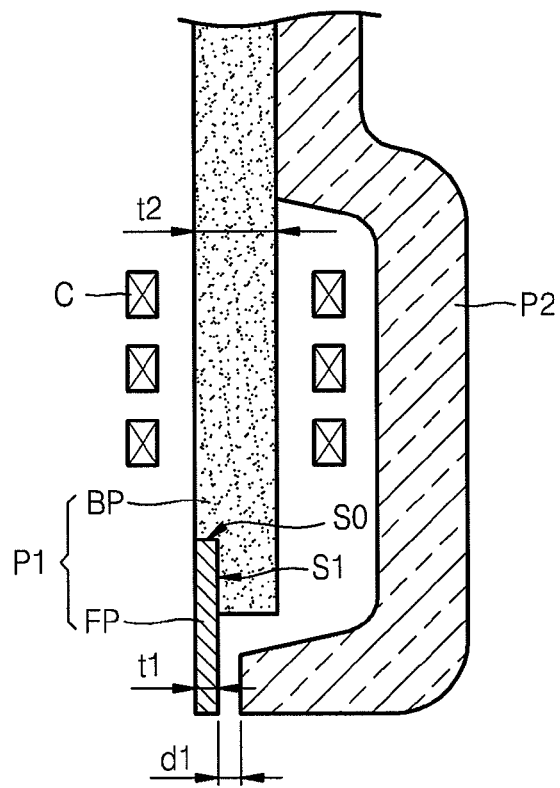
FIG. 3 is a cross-sectional view of a perpendicular magnetic recording head according to one embodiment of the present invention.

FIG. 3 is a cross-sectional view of a perpendicular magnetic recording head according to one embodiment of the present invention (hereinafter, referred to as a first head).

Referring to FIG. 3, the first head comprises a main pole P1, a coil C for applying a magnetic field to the main pole P1, and a return pole P2 constituting a magnetic circuit together with the main pole P1.

The main pole P1 comprises a front pole FP and a back pole BP. The front pole FP has a straight form with a predetermined length. A lower end of the front pole FP is close to a lower end of the return pole P2. An upper end of the back pole BP contacts an upper end of the return pole P2. A lower end of the back pole BP overlaps an upper end of the front pole FP. For example, an upper surface S0 of the front pole FP and an upper portion of a first side surface S1 of the front pole FP may contact a lower end of the back pole BP. The upper surface S0 of the front pole FP may contact the back pole BP and may be opposite a lower surface of the front pole FP, which faces a recording medium. The first side surface S1 may face towards the return pole P2. Likewise, when the back pole BP contacts at least two surfaces of the front pole FP, the flow of a magnetic field may be smooth between the front pole FP and the back pole BP. The thickness t1 of the front pole FP may be in a range of 0.2 to 0.4 μm, but is preferably in a range of 0.2 to 0.3 μm. The thickness t2 of the back pole BP may be in a range of 2 to 5 μm, but is preferably in a range of 2 to 3 μm. The interval d1 between the lower end of the front pole FP and the lower end of the return pole P2 can be in a range of 0.1 to 0.3 μm, but is preferably in a range of 0.1 to 0.2 μm.

As illustrated in FIG. 3, a potion between the lower end and the upper end of the return pole P2 may be curved. The coil C passes through a space between the curved portion of the return pole P2 and the main pole P1, and is wound around the back pole BP of the main pole P1. However, the coil C is spaced away from the front pole FP and the coil C does not contact the back pole BP.

Figure 4:
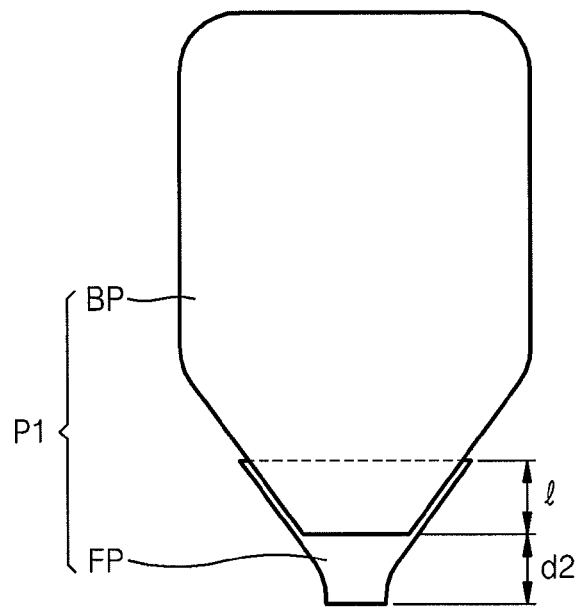
FIG. 4 is a plan view of a main pole of the perpendicular magnetic recording head of FIG. 3.

FIG. 4 is a plan view of the main pole P1 illustrated in FIG. 3, and is viewed from the right side of FIG. 3.

Referring to FIG. 4, the width of the front pole FP increases towards an upper end of the front pole FP from a lower end of the front pole FP. A width of the back pole BP increases towards a predetermined point on the back pole and away from the lower end of the back pole BP. The back pole may have a constant width from the predetermined point to the upper end of the back pole BP. The predetermined point is located above the upper end of the front pole FP.

The shortest distance d2 between a lower surface of the front pole FP (i.e. a bottom surface) and the back pole BP may be in a range of 0.5 to 2.0 μm. The overlap length l of the front pole FP and the back pole BP may be in a range of 0.5 to 4.0 μm. Accordingly, the length d2+l of the front pole FP may be in a range of 1.0 to 6.0 μm.

A specific resistance of the front pole FP is preferably smaller than that of the back pole BP. A saturation magnetization of the front pole FP is preferably higher than that of the back pole BP. For example, the specific resistance of the front pole FP may preferably be in a range of $1 \times 10^{-5}$ to $3 \times 10^{-5}$ Ω·cm, and the specific resistance of the back pole BP may preferably be greater than $3 \times 10^{-5}$ Ω·cm. The saturation magnetization of the back pole BP may preferably be in a range of 1.0 to 2.0 Tesla, and the saturation magnetization of the front pole FP may preferably be higher than 2.0 Tesla. The specific resistance and the saturation magnetization of the return pole P2 may preferably be similar to those of the back pole BP. The front pole FP and the back pole BP may be formed of Co—Ni—Fe or Ni—Fe, and the return pole P2 may be formed of Ni—Fe. The specific resistances and the saturation magnetizations of the back pole BP and the front pole FP vary based on the composition ratio of the Ni—Fe and Co—Ni—Fe. The front pole FP, the back pole BP and the return pole P2 may also be formed of soft magnetic materials other than Ni—Fe and Co—Ni—Fe.

Again, the coil C is wound around the back pole BP. Since the saturation magnetization of the back pole BP can be low, and the specific resistance of the back pole BP can be high, a large eddy current might not be generated inside the back pole BP. Therefore, in this first embodiment of a perpendicular magnetic recording head, the inductance increase of the coil C due to the main pole P1 may be smaller than the inductance increase found in a related perpendicular magnetic recording head as discussed above. Accordingly, the signal delay due to the inductance increase of the coil C may be prevented.

Figure 2:
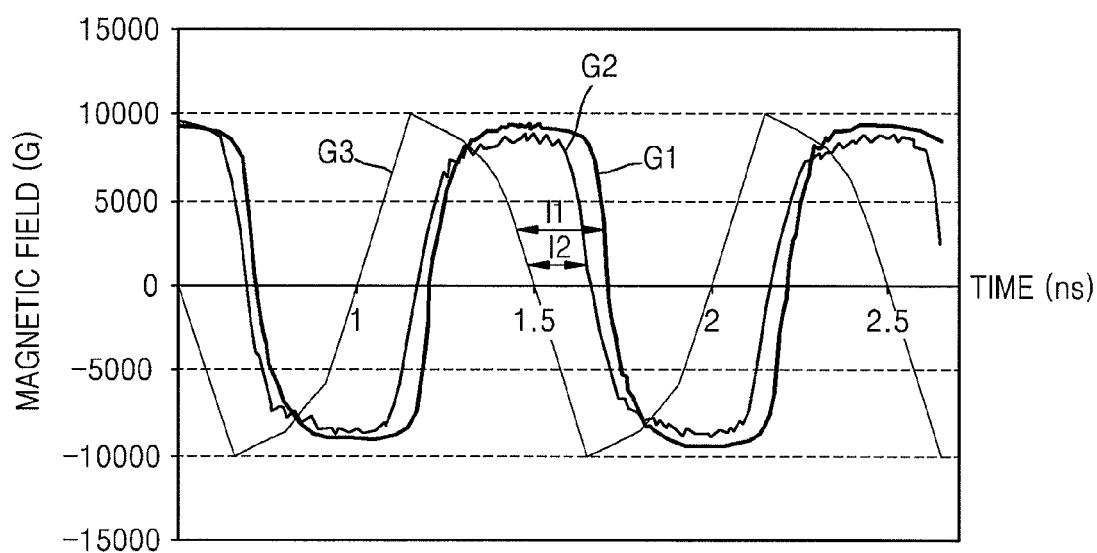
FIG. 2 is a graph showing signal delay that can occur in the related perpendicular magnetic recording head of FIG. 1.

Meanwhile, the front pole FP, which may be disposed close to a recording medium (not shown) has a smaller specific resistance and a larger saturation magnetization than those of the back pole BP. As shown in FIG. 2, the smaller the specific resistance of a material, and the larger the saturation magnetization of the material, the greater the increase velocity of the magnetic flux in the material is.

That is, a time interval between two adjacent maximum points and a minimum point there between in a first plot G1 of FIG. 2 is smaller than a time interval between two adjacent maximum points and a minimum point there between in a second plot G2.

Likewise, the smaller the specific resistance of a magnetic material, the greater the increase velocity of the magnetic flux in the magnetic material. Thus, the increase velocity of the magnetic flux in the first head can be increased by the front pole FP having a small specific resistance.

According to one aspect of the present invention, by dividing the main pole P1 into the front pole FP having a small specific resistance and the back pole BP having a large specific resistance, the signal delay effect due to the inductance increase of the coil C can be reduced, and the velocity of the magnetic flux can be increased. The perpendicular magnetic recording head according to one embodiment of the present invention may have good write properties and a high recording density even at high frequencies.

Figure 5:
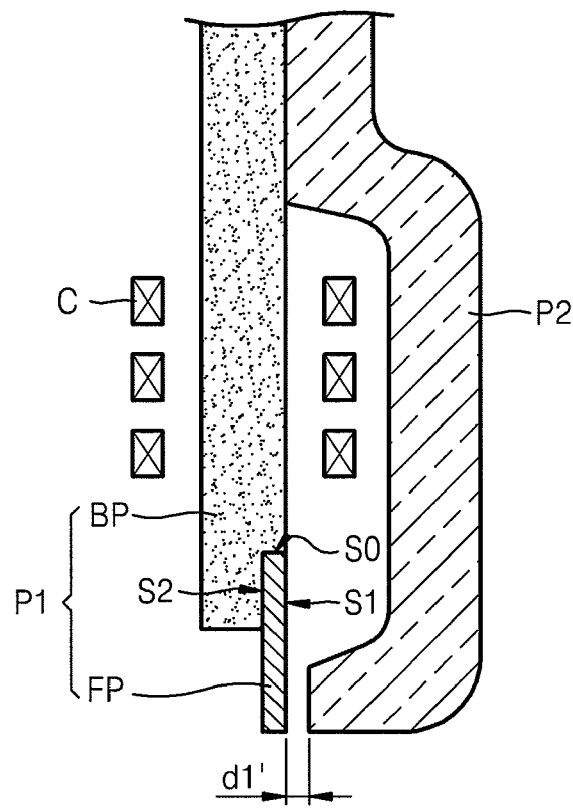
FIG. 5 is a cross-sectional view of a perpendicular magnetic head according to a second embodiment of the present invention.

FIG. 5 is a cross-sectional view of a perpendicular magnetic head according to another embodiment of the present invention (hereinafter, referred to as a second head). The reference numerals used in both FIG. 3 and FIG. 5 denote similar elements.

Referring to FIG. 5, a lower end of a back pole BP contacts an upper end of a second side surface S2. The second side surface S2 is opposite and parallel to the first side surface S1. An interval d1' between a lower end of a front pole FP and a lower end of a return pole P2 may be the same as the interval d1 of the first head of FIG. 3. The shortest distance between a lower surface (i.e. a bottom surface) of the front pole FP and the back pole BP and the overlap length of the front pole FP and the back pole BP may be respectively the same as the shortest distance (d2 of FIG. 4) and the overlap length (l of FIG. 4) of the first head of FIG. 3.

Meanwhile, as illustrated in FIGS. 3 and 5, the front pole FP and the back pole BP may be formed on the same plane in each of perpendicular magnetic recording heads according to several embodiments of the present invention.

Hereinafter, methods of manufacturing a perpendicular magnetic recording head will be described, according to illustrative embodiments of the present invention.

FIGS. 6A through 6E are cross-sectional views of a method (hereinafter, referred to as a first method) of manufacturing a perpendicular magnetic recording head, according to one embodiment of the present invention.

First, referring to FIGS. 6A through 6E, a method of manufacturing a perpendicular magnetic recording head will be described, according to one embodiment of the present invention. The first method may be a method of manufacturing the first head of FIG. 3. The materials and sizes of elements used in the first method may be the same as the materials and sizes of elements included in the first head of FIG. 3. Thus, detailed descriptions of the material and the sizes will be omitted.

Figure 6A:
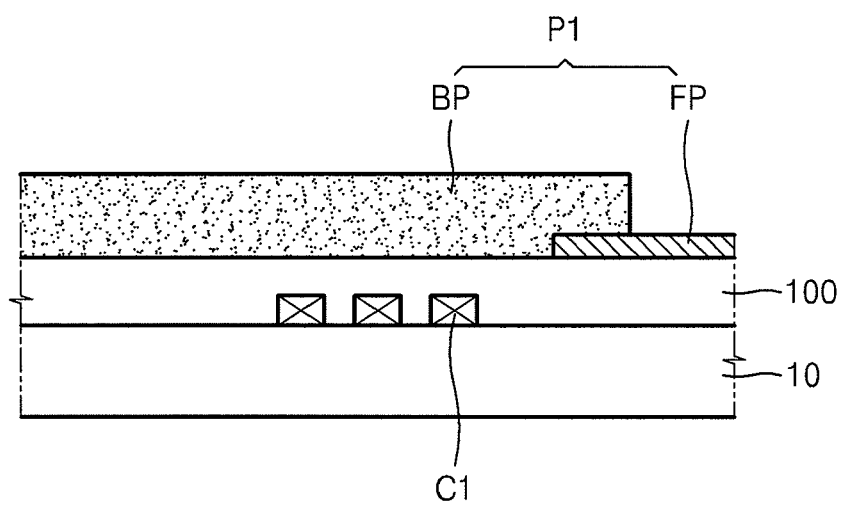
FIGS. 6A through 6E are cross-sectional views of a method of manufacturing a perpendicular magnetic recording head, according to one embodiment of the present invention.

Referring to FIG. 6A, a first inter-insulating layer 100 including a first wiring C1 is formed on a lower structure 10. The lower structure 10 may include a read head (not shown).

A front pole FP can be formed on the first inter-insulating layer 100. A back pole BP can be formed on the first inter-insulating layer 100 to cover a left portion of the front pole FP. The front pole FP together with the back pole BP may constitute a main pole P1.

Figure 7:
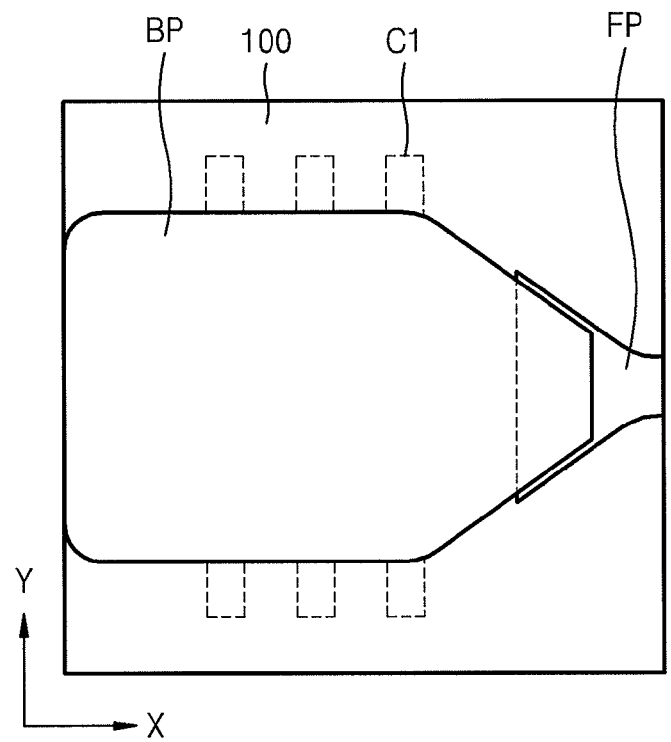
FIGS. 7 and 8 are plan views of FIGS. 6A and 6B, respectively.

FIG. 7 is a plan view of FIG. 6A. Referring to FIG. 7, the front pole FP and the back pole BP may be formed such that the widths of the front pole FP and the back pole BP are the same as described with reference to FIG. 4. In addition, the length of the first wiring C1 may be greater than the width of the back pole BP, wherein the length and the width are measured in the Y axis direction. Thus, it can be seen that a portion of the first wiring C1 may protrude outside the back pole BP.

Figure 6B:
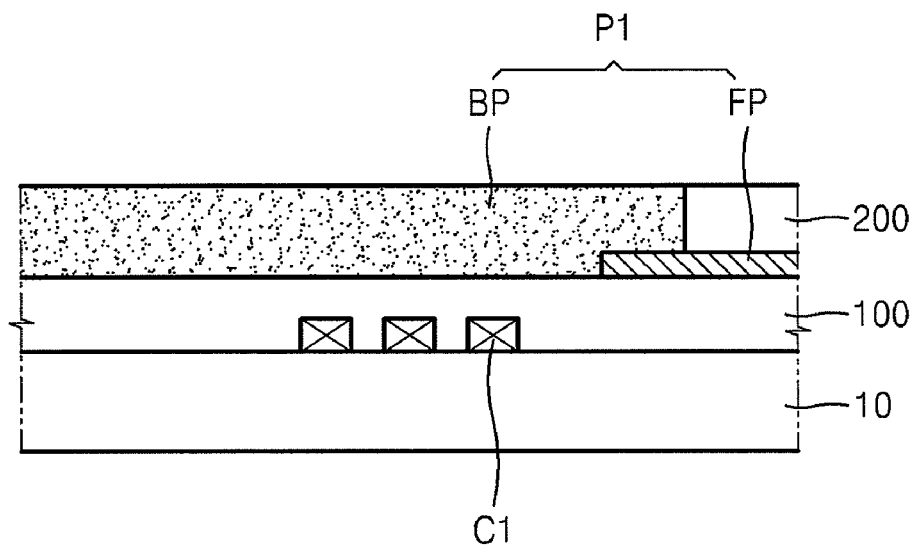
Figure 8:
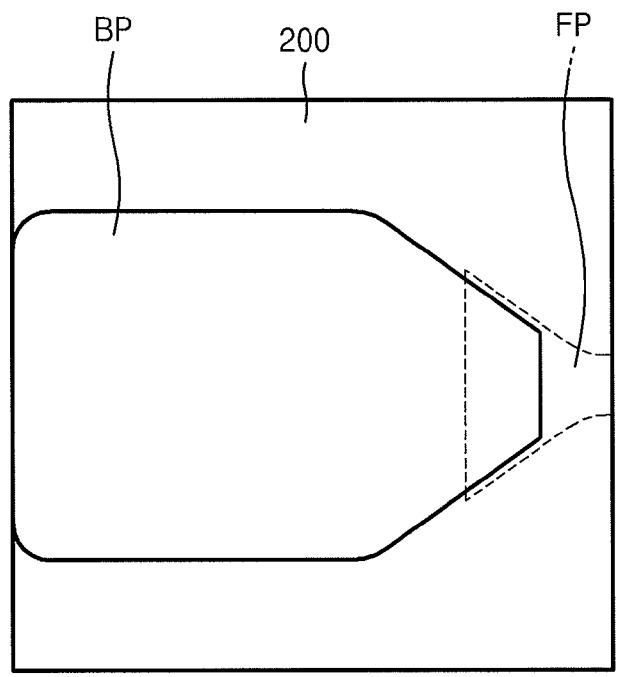

Referring to FIG. 6B, an insulating layer 200 may be formed on a portion of the front pole FP, on which the back pole BP is not formed, so that an upper surface of the insulating layer 200 may be at the same level as an upper surface of the back pole BP. At this time, although not illustrated in FIG. 6B, the insulating layer 200 may also be formed on a portion of the first inter-insulating layer 100, which may be disposed outside the front pole FP and the back pole BP when viewed from above. This can be seen from FIG. 8 that is a plan view of FIG. 6B.

Figure 6C:
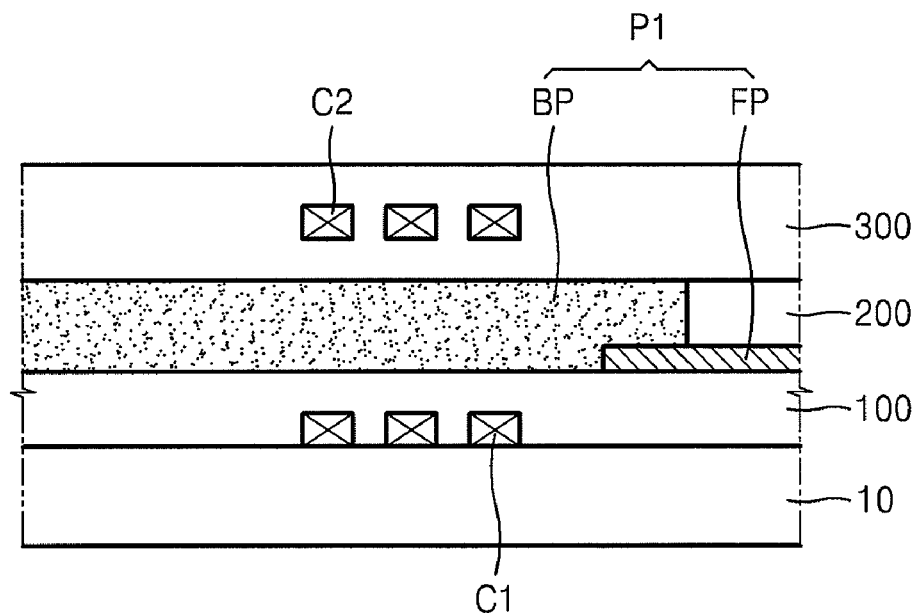

Referring to FIG. 6C, a second inter-insulating layer 300, which may include a second wiring C2 connected to the first wiring C1, may be formed on the back pole BP and the insulating layer 200. The second inter-insulating layer 300 may be formed using two operations, and the second wiring C2 may be formed between the two operations. The first wiring C1 may be connected to the second wiring C2 by conductive plugs (not shown) that are formed through the first inter-insulating layer 100, the insulating layer 200 and the second inter-insulating layer 300 that are disposed between the first wiring C1 and the second wiring C2. At this time, the first and second wirings C1 and C2 may be connected to the conductive plugs so that the first and second wirings C1 and C2 and the conductive plugs may constitute the coil C illustrated in FIG. 3.

Next, a mask (not shown) covering a predetermined area of the second inter-insulating layer 300 including the second wiring C2 may be formed on the second inter-insulating layer 300. The mask may be formed so as to cover a portion of the front pole FP, which may be adjacent to a right end of the back pole BP. Then, a portion of the second inter-insulating layer 300, which is around the mask, may be etched. The etching may be performed until the back pole BP is exposed. In addition, the etching may be performed until an exposed portion of the insulating layer 200 is etched on the front pole FP to be lower than an upper surface of the back pole BP and then the exposed portion may be etched to have a predetermined thickness. The mask may then be removed.

Meanwhile, the etching may include a first-etching exposing the back pole BP using a first mask, and a second-etching thinning the exposed portion of the insulating layer 200 disposed on the front pole FP using a second mask.

Figure 6D:
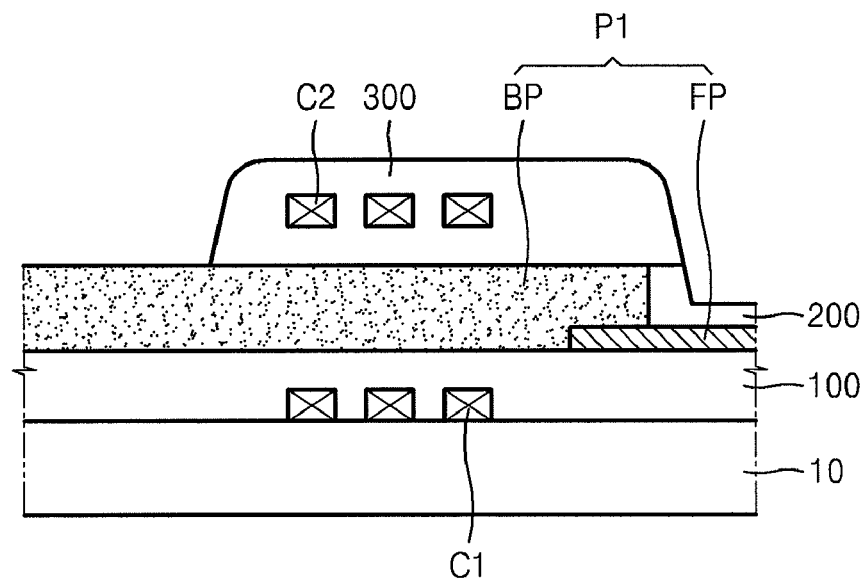

FIG. 6D is a cross-sectional view of a structure that may result from the etching, according to one embodiment of the present invention.

Figure 6E:
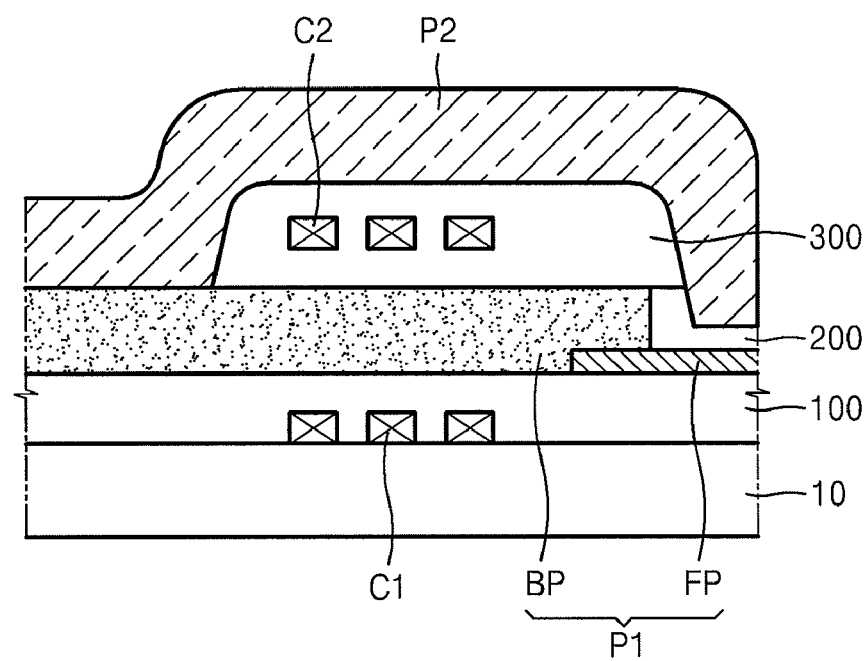

Referring to FIG. 6D, an interval between the front pole FP and a lower end of a return pole P2, which will be formed in a following operation of FIG. 6E, may be determined according to the thickness of a thin portion of the insulating layer 200, which may be formed on the front pole FP.

Referring to FIG. 6E, the return pole P2 covering the exposed portion of the back pole BP may be formed on the insulating layer 200 and the second inter-insulating layer 300.

FIGS. 9A through 9E are cross-sectional views of a method (hereinafter, referred to as a second method) of manufacturing a perpendicular magnetic recording head, according to a second embodiment of the present invention.

The second method may be a method of manufacturing the second head of FIG. 5. The materials and sizes of elements used in the second method may be the same as the materials and sizes of elements included in the second head of FIG. 5.

In addition, reference numerals used in FIGS. 5, 6A-6E, and 9A-9E denoted similar elements.

Figure 9A:
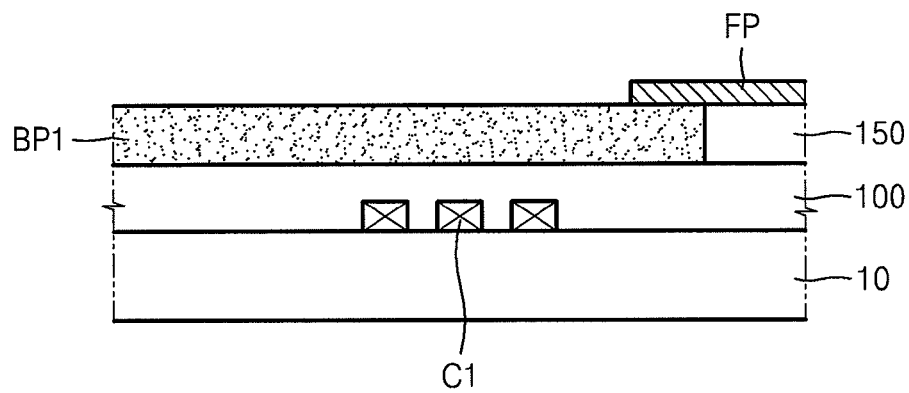
FIGS. 9A through 9E are cross-sectional views of a method of manufacturing a perpendicular magnetic recording head, according to a second embodiment of the present invention.
Figure 10:
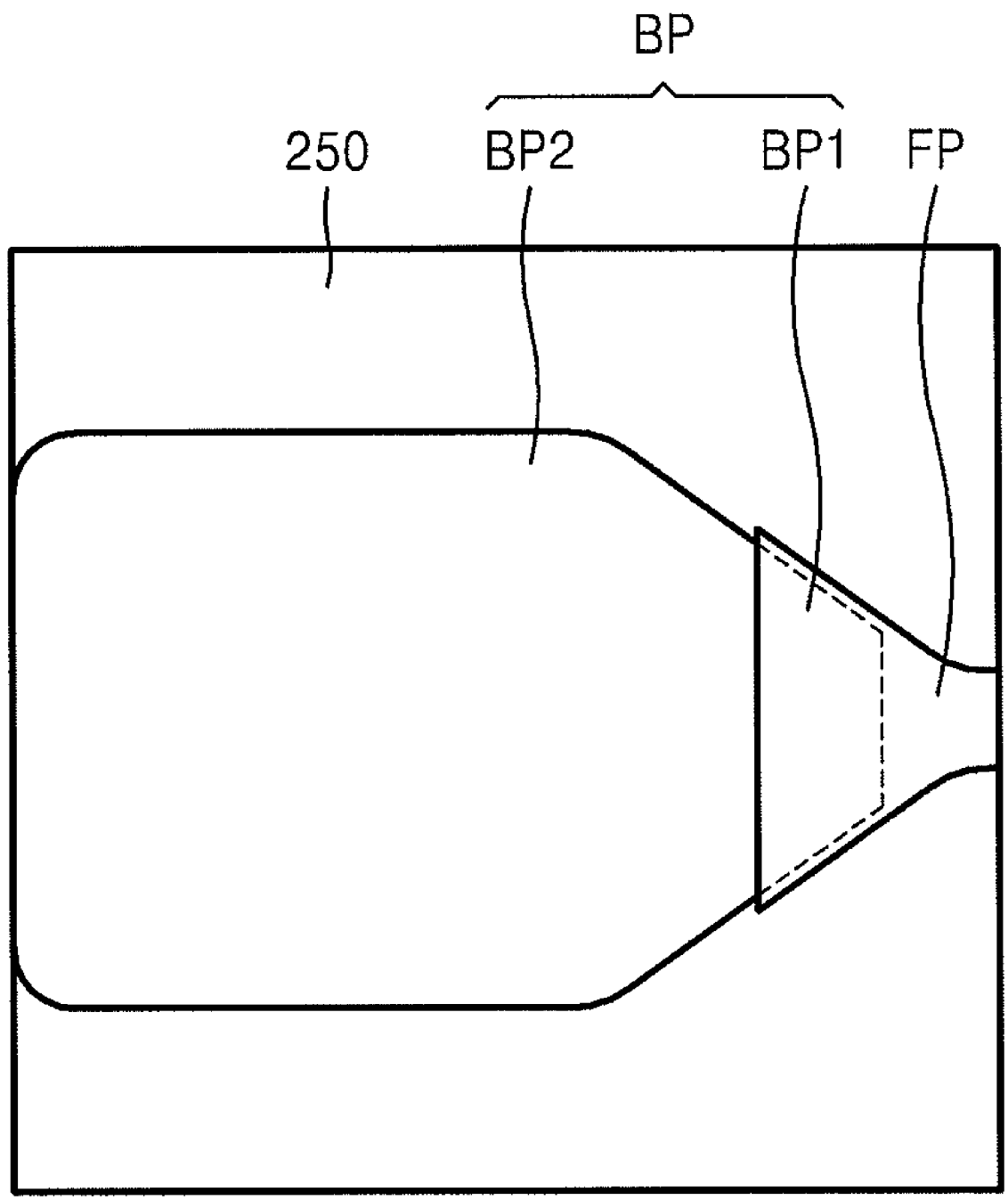
FIG. 10 is a plan view of FIG. 9B.

Referring to FIG. 9A, a first inter-insulating layer 100, which may include a first wiring C1, may be formed on a lower structure 10. A first back pole BP1 may be formed on one predetermined portion of the first inter-insulating layer 100. A first insulating layer 150 may be formed on the rest portion of the first inter-insulating layer 100. The first back pole BP1 and the first insulating layer 150 may be formed to have the same thickness. The first back pole BP1 may be formed so that the first wiring C1 may be disposed below the first back pole BP1. The first back pole BP1 may be formed to have the same shape as a back pole BP illustrated in FIG. 8. A front pole FP protruding onto the first back pole BP1 may be formed on the first insulating layer 150. At this time, the front pole FP may be formed as illustrated in FIG. 10.

Figure 9B:
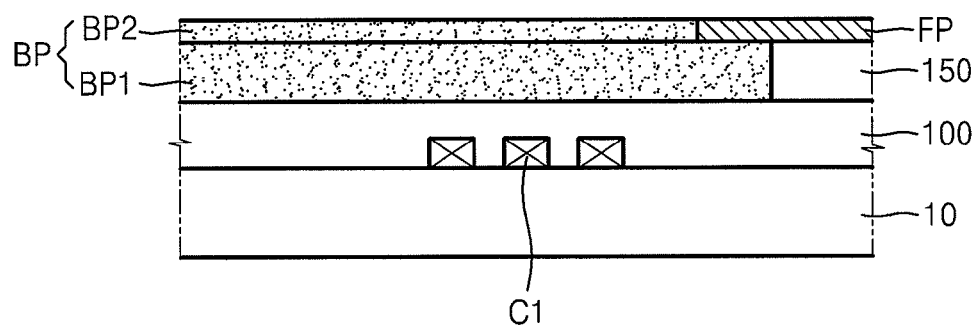

Referring to FIG. 9B, a second back pole BP2 may be formed on a portion of the first back pole BP1, on which the front pole FP is not formed. The second back pole BP2 may be formed to have the same thickness of the front pole FP. The first and second back poles BP1 and BP2 may constitute the back pole BP illustrated in FIG. 5.

Although not illustrated in FIG. 9B, a second insulating layer (not shown) may be formed on a portion of the first insulating layer 150, which may be disposed outside of the second back pole BP2 and the front pole FP when viewed from above. The second insulating layer may be formed to have the same thickness as the second back pole BP2 or the front pole FP. The second insulating layer can be seen in FIG. 10 that is a plan view of FIG. 9B. A reference numeral 250 of FIG. 10 denotes the second insulating layer. The second insulating layer 250 may be a portion of a second inter-insulating layer 300 that will be described later.

Figure 9C:
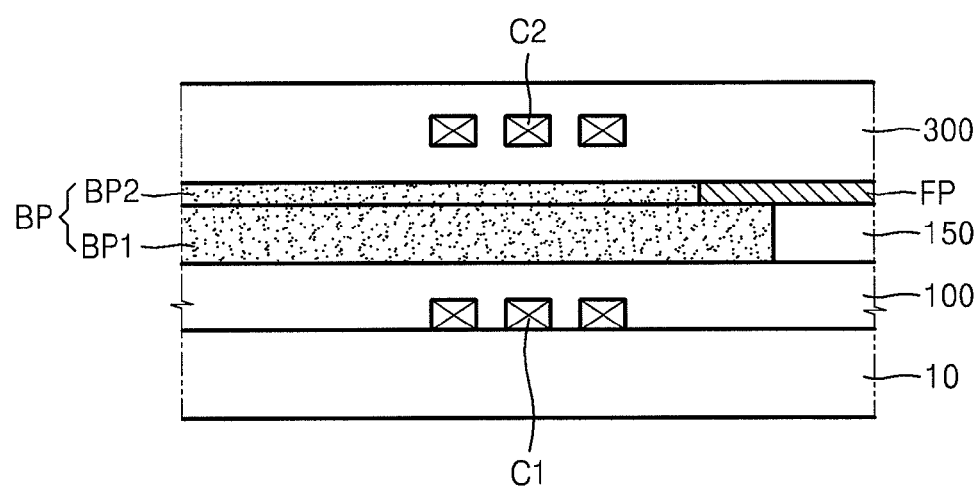

Referring to FIG. 9C, the second inter-insulating layer 300, which may include a second wiring C2 connected to the first wiring C1, may be formed on the second back pole BP2 and the front pole FP. The second wiring C2 may be formed so as to be disposed above the first wiring C1. The first wiring C1 may be connected to the second wiring C2 by conductive plugs (not shown) that are formed through the first inter-insulating layer 100, the first insulating layer 150, the second insulating layer (not shown) and the second inter-insulating layer 300 that are formed between the first wiring C1 and the second wiring C2. The first and second wirings C1 and C2 may be connected to the conductive plugs so that the first and second wirings C1 and C2 and the conductive plugs may constitute the coil C illustrated in FIG. 5.

Figure 9D:
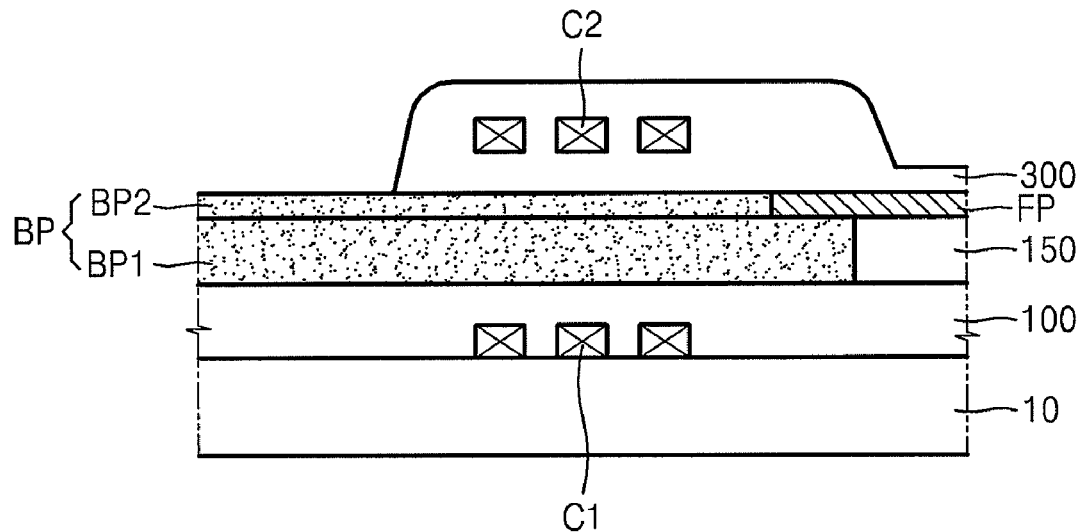

Referring to FIG. 9D, a portion of the second inter-insulating layer 300, which may be disposed on the left of the second wiring C2, may be etched to expose the second back pole BP2. A portion of the second inter-insulating layer 300, which may cover a right (in FIG. 9D) portion of the front pole FP, may be etched to be thin. At this time, an interval between the front pole FP and a return pole P2, which can be formed in the following operation of FIG. 9E, may be determined according to the thickness.

Figure 9E:
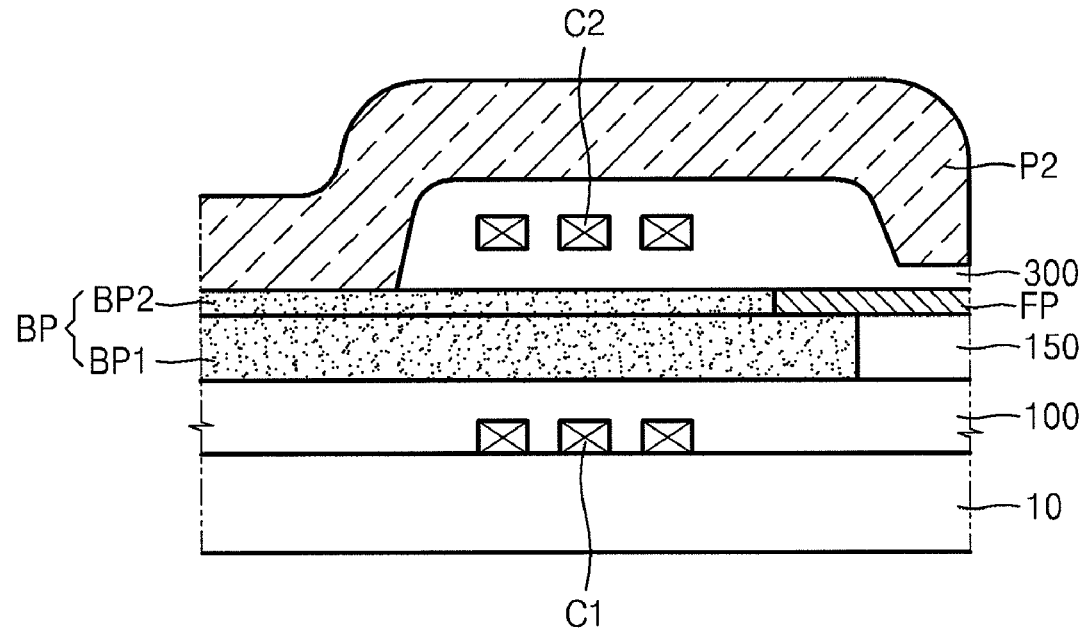

Referring to FIG. 9E, the return pole P2 covering the exposed portion of the second back pole BP2 may be formed on the second insulating layer and the second inter-insulating layer 300.

As described above, the main pole P1 of the perpendicular magnetic recording head according to one embodiment of the present invention may include the front pole FP having a small specific resistance and a large saturation magnetization and the back pole BP having a large specific resistance and a small saturation magnetization. The specific resistance and saturation magnetization characteristics of the back pole BP may prevent the inductance increase of the coil C and the signal delay, which occurs due to the inductance increase. The specific resistance and saturation magnetization characteristics of the front pole FP may increase the increase velocity of the magnetic flux of the main pole P1, by increasing a magnetic field gradient. Accordingly, the perpendicular magnetic recording head according to the present invention may improve write properties at high frequencies. In addition, recording time may be reduced, and recording density may be increased.

While the present invention has been particularly shown and described with reference to exemplary embodiments thereof, it will be understood by those of ordinary skill in the art that various changes in form and details may be made therein without departing from the spirit and scope of the present invention as defined by the following claims. For example, it will be understood by those of ordinary skill in the art that elements of the perpendicular magnetic recording head according to the present invention may be changed and that the structures of the main pole P1, the return pole P2 and the coil C may be changed. Alternatively, the main pole P1 used in the present invention can be used in a magnetic head having different structure from that of the perpendicular magnetic recording head according to the present invention.

What is claimed is:

1. A perpendicular magnetic recording head comprising:
   a main pole;
   a coil, which applies a magnetic field to the main pole; and
   a return pole constituting a magnetic circuit together with the main pole, wherein the main pole comprises a back pole around which the coil is wound and a front pole contacting the back pole, and
   wherein the back pole and the front pole are formed on the same plane, and a specific resistance of the front pole is smaller than a specific resistance of the back pole.

2. The perpendicular magnetic recording head of claim 1, wherein the front pole has a width, which increases towards a portion of the front pole, which contacts the back pole.

3. The perpendicular magnetic recording head of claim 1, wherein a saturation magnetization of the front pole is larger than a saturation magnetization of the back pole.

4. The perpendicular magnetic recording head of claim 3, wherein a saturation magnetization of the back pole is in a range of 1.0 to 2.0 Tesla.

5. The perpendicular magnetic recording head of claim 1, wherein a specific resistance of the front pole is in a range of 10 to 30 $\mu\Omega\cdot$cm.

6. The perpendicular magnetic recording head of claim 1, wherein the front pole is straight, and the back pole contacts an upper surface and a side surface of one end of the front pole.

7. The perpendicular magnetic recording head of claim 6, wherein the side surface of the front pole, which contacts the back pole, faces the return pole.

8. The perpendicular magnetic recording head of claim 6, wherein the side surface of the front pole, which contacts the back pole, is a first surface opposite a second surface of the front pole, and further wherein the second surface faces the return pole.

9. The perpendicular magnetic recording head of claim 8, wherein the back pole comprises a first back pole, which contacts the upper surface of the front pole, and a second back pole, which contacts the side surface of the front pole.

10. The perpendicular magnetic recording head of claim 1, wherein a first end of the front pole contacts the back pole and, further wherein a second end of the front pole is separated from the back pole by a distance in a range of 0.5 to 2.0 µm.

11. The perpendicular magnetic recording head of claim 1, wherein an overlap length, by which the front pole and the back pole overlap each other, is in a range of 0.5 to 4.0 µm.

12. The perpendicular magnetic recording head of claim 1, wherein the front pole has a thickness in a range of 0.2 to 0.4 µm.

13. The perpendicular magnetic recording head of claim 1, wherein the back pole has a thickness in a range of 2 to 5 µm.

14. The perpendicular magnetic recording head of claim 1, wherein the front pole and the return pole are separated by a distance in a range of 0.1 to 0.3 µm.

* * * * *